United States Patent [19]

Rives et al.

[11] Patent Number: 4,739,956

[45] Date of Patent: Apr. 26, 1988

[54] PARACHUTE CANOPY

[75] Inventors: Jean-Francois Rives, Sevres; Jacques Chalon, Paris; Yves Fugen, Elancourt; Jacques Rousseau, Epinay/Orge, all of France

[73] Assignee: Aerazur, Issy-Les-Moulineaux, France

[21] Appl. No.: 931,646

[22] Filed: Nov. 17, 1986

[30] Foreign Application Priority Data

Nov. 18, 1985 [FR] France ............... 85 17005

[51] Int. Cl.$^4$ .......................... B64D 17/18
[52] U.S. Cl. .................... 244/145
[58] Field of Search .......... 244/142, 145, 152

[56] References Cited

U.S. PATENT DOCUMENTS

| 2,764,375 | 9/1956 | Lemoigne . | |
| 2,929,888 | 3/1960 | Ewing . | |
| 3,393,885 | 7/1968 | Neumark . | |
| 3,469,805 | 9/1969 | Craig et al. | 244/145 |
| 4,588,149 | 5/1986 | Gold | 244/145 |

FOREIGN PATENT DOCUMENTS

| 1056062 | 11/1951 | France . |
| 1092383 | 10/1953 | France . |
| 1418752 | 10/1958 | France . |
| 1536477 | 7/1967 | France . |
| 2293362 | 9/1975 | France . |
| 2408522 | 11/1978 | France . |

Primary Examiner—Sherman D. Basinger
Assistant Examiner—Rodney Corl
Attorney, Agent, or Firm—Frost & Jacobs

[57] ABSTRACT

A parachute canopy comprises air entries provided on the canopy itself. The canopy is constituted by an assembly of gores, each gore being composed of three gore portions. The air entries are provided on a predetermined number of gores, the medium gore portion overlapping the lower gore portion. The medium gore portion and the lower one are sewn together only at meridional lines such as to leave a free passage between their overlapping portions which constitutes an air entry.

8 Claims, 3 Drawing Sheets

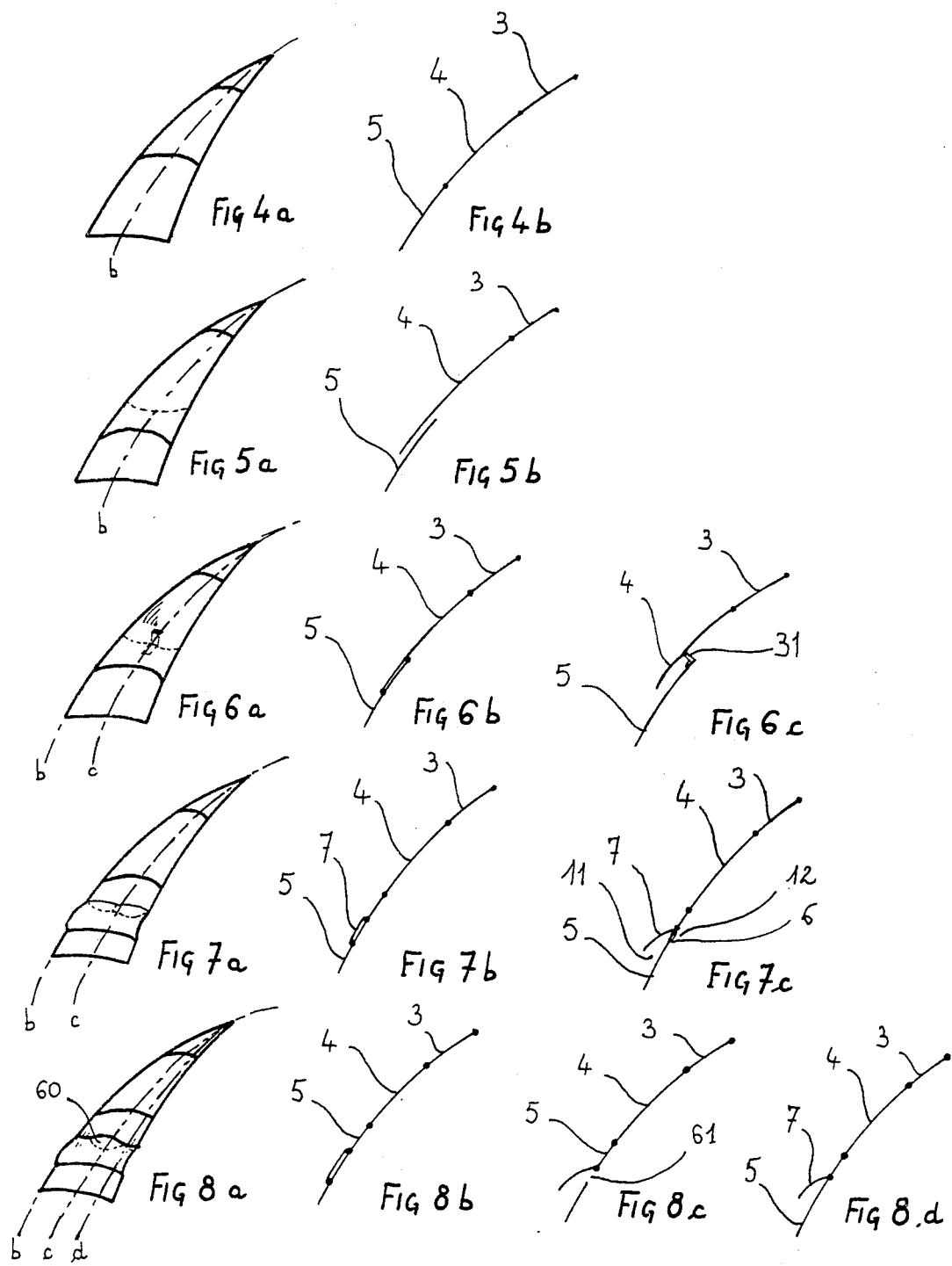

Fig 9.a  Fig 9b  Fig 9c  Fig 9d  Fig 9e
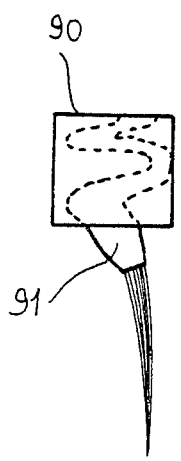
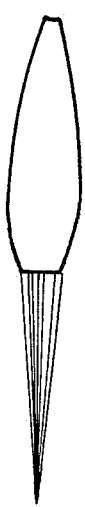
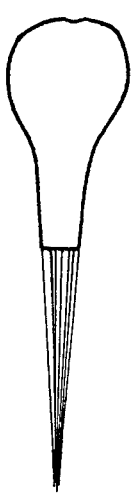
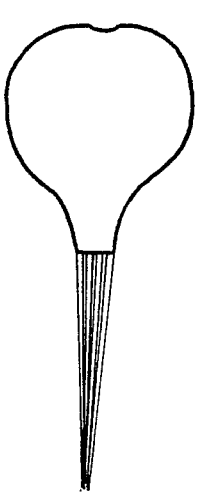
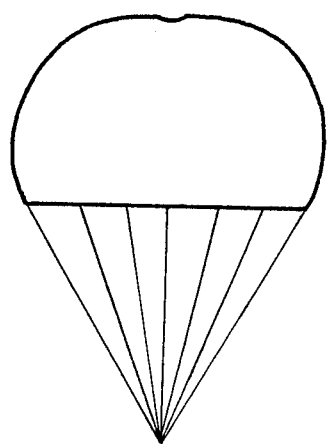
Fig 10.a  Fig 10b  Fig 10c  Fig 10d  Fig 10e
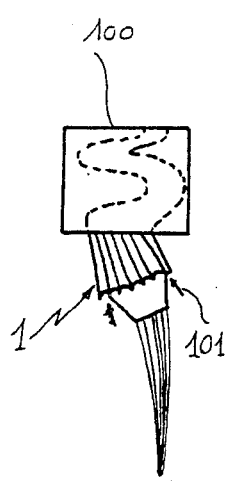
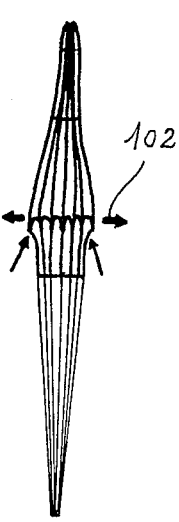
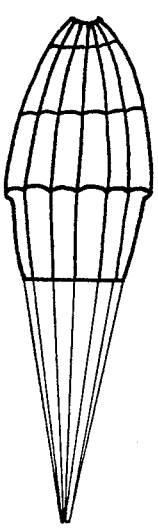
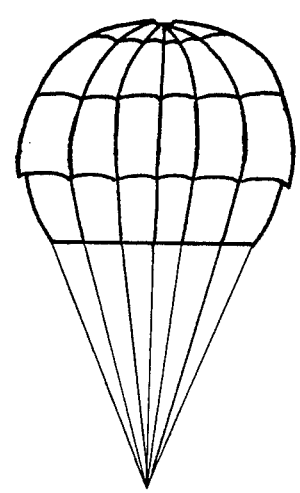

PARACHUTE CANOPY

FIELD OF INVENTION

The present invention relates to a parachute canopy comprising a means for improving inflation characteristics and security during the opening phase of the parachute.

BACKGROUND ART

Numerous improvements on parachute canopies were made during the last years which lead to better performance of the parachute with respect to its guiding behaviour and the ease of handling such as the provision of guiding windows and other guiding means. These improvements have significantly increased the security during the descending phase as well as the exactness of landing. However, the opening phase of the canopy is still a weak point which is open for improvement.

The opening operation of known hemispherical parachutes comprises inflation of the canopy by air entering at and deviated by the skirt portion of the canopy, which air firstly inflates the superior portion of the canopy, then its center portion and finally its portion adjacent the skirt portion. Problems may arise during several phases of the inflation. First, during the opening of the skirt portion due to the fact that at the considered relative speed between the parachute and the air, considerable and dangerous forces, created by the pressure of the air against the skirt portion, cause severe flapping of the latter during which the skirt portion has the tendency of alternatingly carrying out opening and closing movements. It is very important to restrict the duration of this flapping phase and to assure that it finally ends with the opening of the canopy. Secondly, subsequent to the opening of the skirt portion and the beginning of the inflation of the canopy, opeation problems may arise. Two principal types of malfunctioning are known, one being the appearance of a double dome or a partial inversion and the other, the formation of a pear-like body which may be formed at high speed whereby the canopy is not entirely inflated, constituting an equilibrium between internal and external pressures on either side of the canopy which, herewith, maintains the shape of a pear.

French Pat. No. 1,418,752 provides escape channels for the air arranged at the superior half portion of the canopy in addition to the central channel. The objective thereof is a smoothing of the shock during opening of the canopy and the increase of stability thereof. At the same time these improvements lead to increased security for the opening, as the air entering the canopy in counter current inflates the peak portion of the canopy and disrupts the eventual equilibrium between the internal and external pressures, thereby assuring total inflation. This solution, however, does not increase the inflation speed, does not inhibit the flapping of the skirt portion and relates particularly to the braking before the complete opening of the parachute canopy.

Further, U.S. Pat. No. 2,929,588 proposes to uniformly dispose slots between overlapping trapezoidal gore portions in an annular pattern over the entire canopy, such that the dome, once inflated, represents a perfect hemispherical body, rather than a flat ellipsoid. Such canopies also permit to smooth the opening shock, one of the objectives of the above patent, and to provide the parachute with a positive opening tendency. However this type of canopy does not primarily emphasize the function of the skirt portion since air may pass through all slots simultaneously and without preference. On the other hand, a substantial inconvenience arises from the slots themselves as they are arranged in side-by-side relationship such that they do not provide any directional effect.

U.S. Pat. No. 3,393,885 provides a means permitting control of the air flow through channels such as described in the above French patent. Cross straps are uniformly arranged across the channels, the lengths of these cross straps being substantially identical across the channels. These cross straps connect the superior edge of the channel to the canopy, in particular to the gore portion which supports this channel. The efflux of air is thus guided through a rectangular opening and not anymore through a sickle-shaped slot. Thererefore, differential speed distributions across the opening are inhibited and the efflux approaches the laminar model. These rectangular openings provide a reliable effect during the phase subsequent to inflation, whereby during the inflation the cross straps also prohibit inversion of the canopy, but they do not necessarily contribute to the speed and security of inflation or to the positive opening tendency.

In the following description the term "air entry" is employed to designate a volume within which the air effects a positive effort with respect to the opening of the canopy during which said air is compressed (RAM AIR). The term "air entry" should not be understood in the common meaning designating the section of an air passage only.

OBJECT OF THE INVENTION

It is the object of the present invention to eliminate the problems encountered with canopies as described above with respect to inflation and to provide a canopy having a considerably increased opening speed, in order to permit parachute descents of modest heights.

SUMMARY OF INVENTION

The above object is met by a parachute canopy according to the present invention which is characterized in that it comprises at least one air entry arranged at the inferior portion of the dome. In order to improve the inflation phase of the canopy, the channel may be replaced by a slot covered by a scoop. Another aspect of the invention provides at least one cross strap connecting the exterior wall of the air entry with the surface of the canopy linking the top area of the respective gore portion covered by said air entry with the portion of the exterior wall of the air entry adjacent the top portion of said gore portion thus decreasing the cross section of the air entry between the air entry and the interior of the canopy without decreasing the cross section of the opening between the air entry and the exterior (RAM AIR).

The presence of the channels above the skirt portion within the lower portion of the canopy permits to start inflation as soon as the canopy has left its container. The skirt portion opens under the action of air current entering through the air entries and provokes the inflation of the lower portion of the canopy. The flapping tendency is eliminated and the opening occurs virtually immediately. The formation of a double dome or the appearance of a pear-like body are avoided.

BRIEF DESCRIPTION OF THE DRAWINGS

The invention is described in the following by way of example with reference to several figures, whereof:

FIGS. 4a and 4b, are perspective views of a longitudinal section of a gore of a canopy without a channel.

FIGS. 5a and 5b, are perspective views of a longitudinal section of a gore of a canopy having a channel according to the present invention.

FIGS. 6a to 6c, are perspective sectional views of a variant of the gore of FIG. 5a.

FIGS. 7a to 7c, are perspective sectional views of another variant of a gore of a canopy of the present invention.

FIGS. 8a to 8d, are perspective sectional views of a variant of a gore of the canopy according to the invention.

FIGS. 9a to 9e, illustrate in a schematical manner the opening phases of a hemispherical parachute of the prior art.

FIGS. 10a to 10e, finally illustrate in a schematical manner the opening phases of a hemispherical parachute of the canopy which is provided with air entries according to the present invention.

DETAILED DESCRIPTION OF THE INVENTION

Figure 1:
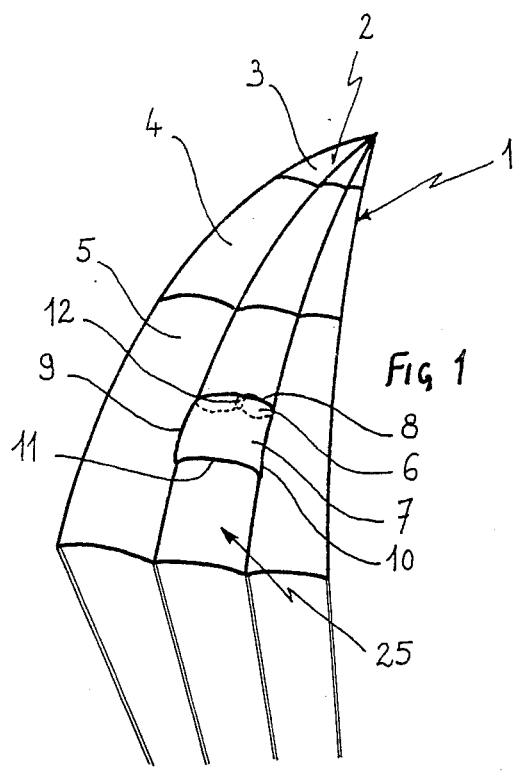
FIG. 1, is a schematical partial perspective view of a first embodiment of the canopy illustrating gores and channels according to the present invention.

The parachute canopy 1 represented by FIG. 1 is constituted by an assembly of gores 2 of essentially triangular shape, each gore comprising three gore portions 3, 4 and 5. These gore portions of one gore are sewn together edge to edge. A certain number of gore portions along the circumference of the canopy comprise air entries having the shape of slots 6 arranged in a lower gore portion 5 and covered by a scoop constituted by a fabric band 7 which is sewn to the upper edge 8 of said slot as well as along the meridional lines 9 and 10. A loose side 11 of the fabric band 7 constitutes thereby the entry of said air entry FIG. 1 also comprises in dashed lines, the lower edge of the slot 6 which is linked to the upper edge of said slot by a strap 12. Said strap 12 operates in the plane of the canopy and serves to limit the spreading between the upper and lower edges of the slot such that the air entry is inflated by breaking the air current passing therethrough whereby the breaking is obtained by decreasing the cross section of the air entry at the interface between the air entry and the interior of the canopy compared to the cross section of the interface between the exterior of the canopy and the air entry. Such arrangements are typically for devices generally called RAM AIR.

The above mentioned air entries permit the penetration of air into the interior of the canopy as soon as the latter has left its container. The inflation of the parachute begins thus immediately whereby the lower portion of the canopy is spread under the effect of air current entering the canopy by the above air entries which assures the spreading apart of the skirt portion of the canopy and which eliminates the flopping.

Figure 2:
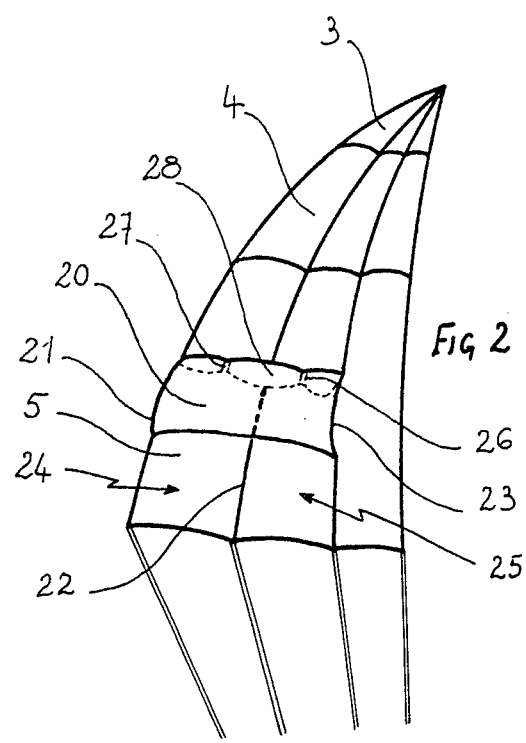
FIG. 2 is a schematical partial perspective view of a second embodiment of the canopy according to the present invention.

The canopy represented in FIG. 2 shows a scoop overlapping two adjacent gores, the band 20 continuing across the two scoops whereby the ends of said band are sewn to two meridional lines 21 and 23 situated on either side of the two split gores 24 and 25 wherein two straps 26 and 27 are fastened between the upper and lower edges of the slot 28. In another embodiment of this variant, the band 20 is sewn at its center to the meridional line 22. According to other embodiments of the canopy represented in FIG. 2 a plurality of scoops are distributed along the circumference of the canopy whereby air entries may be provided on isolated gores or across several adjacent gores whereby the band 20 may be continuing along the entirety or a part of the circumference and sewn to the canopy along each meridional line or only along a certain number of meridional lines and each scoop may comprise one or several straps.

Figure 3:
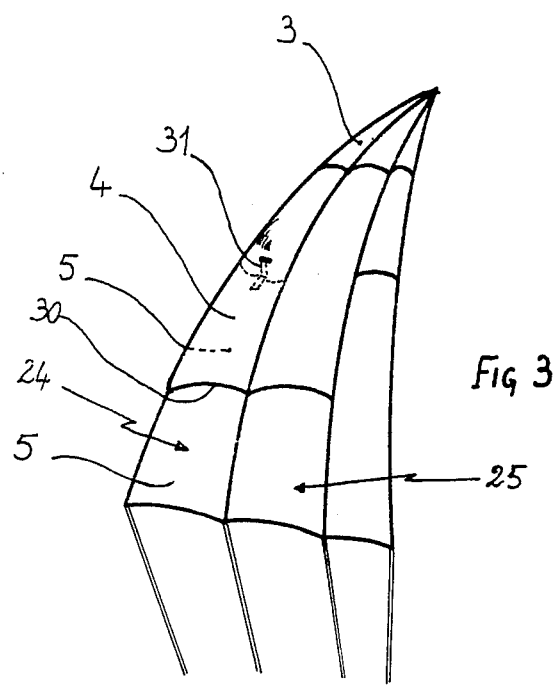
FIG. 3, is a partial schematical perspective view of a third embodiment of the present invention.

In FIG. 3, a certain number of gores distributed over the circumference of the canopy comprise a medium gore portion 4 which overlaps the lower gore portion 5, such that it constitutes an air entry 30. A strap 31 connects the upper edge of the lower gore portion 5 to a surface portion of the medium gore portion 4 overlying said upper edge of the lower gore portion 5 whereby a strap 31 operates in a plane more or less perpendicular to the plane of the canopy.

Such air entries permit the penetration of air into the interior of the canopy as soon as the latter has left its container. The air entry represented on gore 24 of FIG. 3, is shown in an identical way on the adjacent gore 25.

FIG. 4a, illustrates the three gore portions of a gore which does not comprise any air entry according to the invention. The section along the line b, is represented in FIG. 4b wherein the three gore portions 3, 4 and 5 are sewn edge to edge.

FIG. 5a, represents a gore provided with an air entry according to the invention illustrating an embodiment comprising an overlapping of the lower gore portion 5 by the medium gore portion 4 whereby said air entry is not provided with a strap. The section along the line b is represented in FIG. 5b showing the overlapping of the two gore portions.

FIG. 6a, represents a gore provided with an air entry according to the invention in an embodiment comprising overlapping of the lower gore portion 5 by the medium gore portion 4, further comprising a strap 31 which is arranged between the upper edge of the lower gore portion and a part of the surface of the medium gore portion. The section according to line b, represented in FIG. 6b illustrates this overlapping. The strap 31 operates in a plane essentially perpendicular to the plane of the canopy which is emphasized by the representation of FIG. 6c showing a section of the gore of FIG. 6a along line c.

FIG. 7a, represents a gore provided with an air entry according to the invention in an embodiment constituted by a slot and a superposed scoop and the section along line b represented by FIG. 7b, shows the fabric band 7. FIG. 7c, represents a section of FIG. 7a, along the line c and indicates the entry 11 of the air entry and the strap 12 which links the lower edge of slot 6 to its upper edge, said strap 12 operating in the plane of the canopy.

FIG. 8a, represents a variant of FIG. 7a showing the decrease of the cross section of the air entry in direction to the interface between the air entry and the interior of the canopy whereby the lateral ends of the slot 60 are sewn together in order to decrease the cross section of said slot. FIG. 8b, represents a section along line b of FIG. 8a showing the fabric band 7. FIG. 8c, being a section along the line c shows the air exit 61 of the air entry. FIG. 8d finally being a section along the line d indicates that the edges of slot 60 are connected to each other.

The invention has been described for canopies of straight construction. It is understood that air entries may also be provided on canopies of slant construction. The canopies as described above comprise sewn gore portions constituting the gores but a number of different modes of connecting the gore portions to each other are possible. A modification in the shape of the gore portions, however, using air entries according to the present invention, remains under the scope of said invention.

FIGS. 9a to 9e, illustrate in a schematical manner the development of a canopy of a conventional hemispherical parachute illustrating the parachute at five characteristic moments during its opening. FIG. 9a, represents the parachute container 90 from which a canopy 91 of the prior art is ejected. FIG. 9b shows the canopy in an extended oval shape whereby air penetrating through the skirt portion begins to inflate the top portion of the canopy and creates a pear like body represented in FIG. 9c which progresses as shown in FIG. 9d to finally lead to the complete opening of the parachute as shown in FIG. 9e. FIGS. 10a to 10e, illustrate the opening of a parachute canopy according to the present invention having air entries. From container 100, the canopy 1 having air entries according to anyone of the above mentioned embodiments is ejected and arrows 101 show the penetration of air into the lower portion of the canopy as soon as the lower portion thereof has left the container. In FIG. 10b, the arrows 102 show the resulting effect of the air entries which leads to the spreading of the skirt portion constituting the lower portion of the canopy. This skirt portion has the tendency to spread apart before the upper portion, as shown in FIGS. 10c and 10d in order to obtain a complete opening as shown in FIG. 10e. The synoptic presentation of the two systems shows the important difference as to the spreading of the skirt portion of the canopy between a parachute canopy of the prior art and one which is provided with air entries according to the present invention.

Advantageously, one may provide parachute canopies comprising air entries according to the present invention as well as known guiding windows. The present invention is not limited to the illustrated examples and to applications as described above. It may be subject to variations and modifications which lie within the knowledge of the skilled man of the art. In this context the employment of a canopy according to the present invention having high opening speed for the braking of air planes at the landing phase or for the braking of ammunition containers released from air planes may also be envisaged.

The invention has been described with reference to a canopy comprising three gore portions in each gore, however any number from two or more gore portions may be contemplated.

We claim:

1. A parachute canopy comprising an assembly of gores each having at least two gore portions, a lower gore portion being fastened adjacent its upper edge to a lower edge of a higher gore portion, at least one gore having a slot arranged in said lower gore portion of said gore, said slot being arranged at an inner end of an air entry formed by an upper portion of a gore portion below said slot and by a fabric band fastened to a lower edge of the gore portion above said slot, said fabric band overlapping with the upper portion of the gore portion below said slot, all of said air entries being arranged within a lower portion of said canopy.

2. The parachute canopy of claim 1, wherein said fabric band is fastened with its side edges to meridional lines separating the gore comprising said fabric band from adjacent gores.

3. The parachute canopy of claim 2, wherein the fabric band extends over at least two gores.

4. The parachute canopy of claim 1, wherein cross straps connect the upper edge of the fabric band and the upper edge of the gore portion below said slot.

5. The parachute canopy of claim 4, wherein said cross straps are arranged near the lower edge of the gore portion above said slot in order to limit the cross section of said slot without decreasing the cross section of an entry portion of said air entry.

6. The parachute canopy of claim 4, wherein the fabric band extends over at least two gores.

7. The parachute canopy of claim 1, wherein the fabric band extends over at least two gores.

8. The parachute canopy of claim 7 wherein the fabric band is fastened to each meridional line separating gores with air entries, as well as to meridional lines between a gore with air entries and adjacent gores without air entries.

* * * * *